United States Patent Office 3,528,972
Patented Sept. 15, 1970

3,528,972
QUATERNARY ANTHRAQUINONE MORPHOLINO AND PIPERIDINO SALTS
Gregoire Kalopissis, Paris, Andrée Bugaut, Boulogne-sur-Seine, and Jacques Bertrand, Tremblay-les-Gionesses, France, assignors to Societe anonyme dite: L'Oreal, Paris, France
No Drawing. Application Oct. 23, 1967, Ser. No. 677,068, now Patent No. 3,422,895, dated May 6, 1969, which is a division of application Ser. No. 639,915, May 19, 1967, now Patent No. 3,467,483, dated Sept. 9, 1969, which in turn is a continuation of application Ser. No. 319,635, Oct. 24, 1963. Divided and this application Sept. 20, 1968, Ser. No. 761,297
Claims priority, application France, Oct. 29, 1962, 913,810; Jan. 8, 1963, 920,795; Apr. 2, 1963, 930,212; June 20, 1963, 938,822
Int. Cl. C07d 87/46
U.S. Cl. 260—247.1                7 Claims

ABSTRACT OF THE DISCLOSURE

Hair dye compound which is color stable having the formula

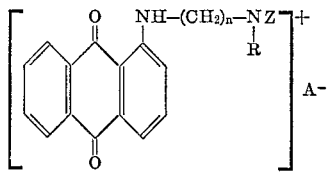

in which $n$ is an integer between 2 and 6 inclusive, R is a lower alkyl, NZ is selected from the group consisting of morpholino and piperidino, and $A^-$ is an anion selected from the group consisting of halogen, methylsulphate and sulphate.

---

This application is a division of application 677,068, filed Oct. 23, 1967, now U.S. Pat. 3,422,895, which was a division of application 639,915, filed May 19, 1967, now U.S. Pat. 3,467,483, which was a streamlined continuation of application 319,635, filed Oct. 24, 1963, now abandoned.

This invention relates to new, improved hair dye compounds that are amino derivatives of anthraquinone which are unusually sun and weather resistant of color changes.

The dyestuff compounds of this invention have the formula:

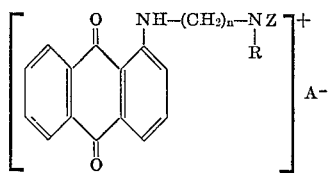

in which $n$ is a whole number between 2 and 6 inclusive, R is a lower alkyl which preferably has 1 to 6 carbon atoms, NZ is a heterocyclic radical such as morpholino or piperidino and A is an anion, such as a halide, ethylsulphate, sulphate or methosulphate. Since these compounds are unexpectedly odorless, have excellent dyeing properties and the colors produced are resistant to sunlight, their use is very desirable in the cosmetic field. Since such compounds are generally used in the form of solutions for dyeing live human hair, it is important and desirable both for the persons whose hair is being dyed and for the personnel of the beauty salon, that the treatment takes place without releasing bad odors.

Among the compounds which fall within the scope of the invention the following are particularly advantageous:

1 - methyl[(1 - anthraquinonylaminoethyl) - methylmorpholinium] sulphate, 1-methyl[(1-anthraquinonylaminopropyl)-methyl-piperidine] sulphate, 1-anthraquinonylaminoethyl)methylmorpholinium ethylsulphate and 1-anthraquinonylaminoethyl-methylmorpholinium chloride.

These new compounds are obtained from anthraquinone derivatives which have a correspondingly tertiary amine function.

The latter may be prepared from 1-chloroanthraquinone by condensation using heat in the presence of mixture of copper acetate and potassium acetate with an alkaline diamine having the formula:

in which $n$ and NZ have the same significance as in the general formula given above.

The quaternization of these tertiary anthraquinonic derivatives may be easily accomplished in a known manner using a quaternizing agent such as methylsulphate or an alkyl halide in the presence of an appropriate salt.

The dyeing solutions according to the invention are prepared by simply dissolving in water one or more compositions having the general formula given above in the presence or in the absence of other coloring agents and by then introducing into the solution conventional dye composition ingredients such as dispersing agents, emollients, perfume, etc.

The dye compound concentration of the dye compositions may be varied within broad limits and the choice of concentration is determined by the result sought. The hair is colored by means of the solutions in the usual manner by applying it preferably at room temperature to the hair for the length of time required.

The pH of the solution used may vary within broad limits and is preferably between 4.5 and 9.5.

The dyes generally yield reddish colors.

The invention may be better understood with reference to the following examples which illustrate the preferred method of making and using the compounds of this invention.

PREPARATION OF COMPOSITIONS

Example 1. Preparation of methyl-[(1-anthraquinonylaminoethyl)methyl-morpholininum] sulphate

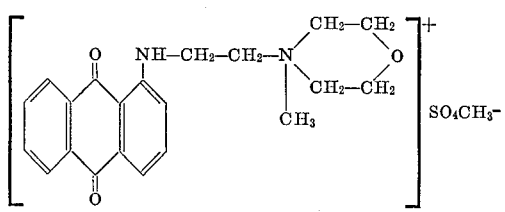

The 1-(β-morpholino-ethyl)-amino-anthraquinone is prepared by heating to reflux for 7 hours under agitation a mixture of 0.2 mole of 1-chloro-anthraquinone and 0.8 mole of β-amino-ethylmorpholine in solution with 240 cc. of isobutanol in the presence of 1.2 grams of potassium acetate and 0.1 gram of copper acetate.

This is dried, washed with water and redried at 100°. The product is obtained with a yield of 55% and melts at 161–162°.

*Analysis.*—Calculated (percent): C, 71.43; H, 5.95; N, 8.33. Found (percent): C, 71.18; H, 6.02; N, 8.16.

Beginning with this base, the corresponding quaternary composition is prepared by treating it with methylsulphate in toluene at 80°.

The product is obtained with a yield of 94% and melts with decomposition at 214 to 217°.

*Analysis.*—Calculated (percent): N, 6.06. Found (percent): N, 6.01.

Example 2.—Preparation of methyl-[(1-anthraquinonyl-aminopropyl)-methylpiperidine]sulphate

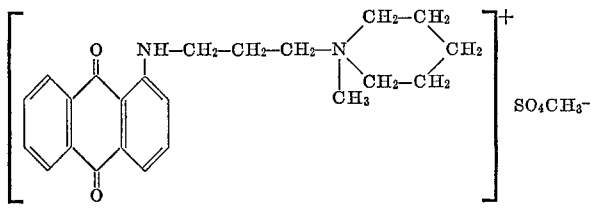

1 - (γ-piperidine-propyl)-amino-anthraquinone is prepared by carrying to reflux for 7 hours a mixture of 0.05 mole of γ-chloroanthraquinone and 0.2 mole of γ-aminopropylpiperidine and 60 cc. of toluene in the presence of 5 grams of potassium acetate and 0.3 gram of copper acetate.

This is extracted with HCl, precipitated with NaOH and then dried and washed. The raw product is recrystallized in hexane and melts at 97 to 98° and is obtained with a yield of 58%.

*Analysis.*—Calculated (percent): C, 75.86; H, 6.90; N, 8.04. Found: (percent): C, 75.81; H, 6.90; N, 8.13.

In order to obtain the quaternary this base is reacted with cold methylsulphate in toluene in the customary manner.

The product obtained with a yield of 97% melts with decomposition at 162 to 163°.

*Analysis.*—Calculated (percent): N, 5.91. Found: (percent): N, 5.73–5.78.

APPLICATION OF THE COMPOSITION

Example 3

The following mixture is prepared:

methyl-[(1-anthraquinonylamino(ethyl)-methyl-morpholinium]sulphate—1 g.
sodium carbonate—q.s.p. pH 9
water—q.s.p. 100

This solution is applied to chestnut colored hair. It is left in contact for 15 minutes at room temperature. The hair is abundantly rinsed with water and dried. This yields a color having mahogany glints.

Example 4

The following mixture is prepared:

methyl-[(1-anthraquinonylaminopropyl)-methylpiperidine]sulphate—3 g.
octyl phenol condensed with 10 to 11 molecules ethylene oxide—2.5 g.
sodium carbonate—q.s.p. pH 7

This solution is applied to white hair under the same conditions as in the preceding example and leads to a deep red color.

What is claimed is:
1. A compound having the formula:

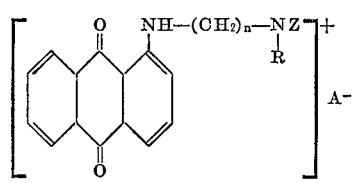

in which $n$ is an integer between 2 and 6 inclusive, R is lower alkyl having 1–6 carbon atoms, NZ is selected from the group consisting of morpholinium and piperidinium, and $A^-$ is an anion selected from the group consisting of halogen, ethylsulphate and methylsulphate.

2. A compound of claim 1, in which said compound is methyl[(1 - anthraquinonylaminoethyl)-methyl-morpholinium]sulphate.

3. A compound of claim 1, in which said compound is methyl[(1-anthraquinonylaminopropyl)-methyl-piperidinium]sulphate.

4. A compound of claim 1, in which $A^-$ is a halide.

5. A compound of claim 1, in which $A^-$ is methylsulphate.

6. A compound of claim 1, in which $A^-$ is ethylsulphate.

7. A compound of claim 1, in which said compound is ethyl[(1 - anthraquinonylaminoethyl) - methyl morpholinium]sulphate.

References Cited

UNITED STATES PATENTS 3,100,739    8/1963    Kaiser et al. _____ 107—88

ALEX MAZEL, Primary Examiner

J. TOVER, Assistant Examiner

U.S. Cl. X.R.

8—10.1; 260—247.5, 272